United States Patent [19]

Hamaue

[11] Patent Number: 5,165,718
[45] Date of Patent: Nov. 24, 1992

[54] SENSOR FOR SEAT BELT PRETENSIONER

[75] Inventor: Tetsuya Hamaue, Shiga, Japan

[73] Assignee: Takata Corporation, Tokyo, Japan

[21] Appl. No.: 724,920

[22] Filed: Jul. 2, 1991

[30] Foreign Application Priority Data

Jul. 2, 1990 [JP] Japan .................. 2-174763

[51] Int. Cl.⁵ .................. B60R 22/36; B65H 75/48
[52] U.S. Cl. .................. 280/806; 180/282; 242/107; 200/61.45 R; 297/480
[58] Field of Search .............. 280/806, 734; 180/282; 200/61.45 R, 61.53, 61.58 B; 297/480; 242/107.4 A, 107

[56] References Cited

U.S. PATENT DOCUMENTS 3,628,384 12/1971 Jones .................. 200/61.45 R
4,427,216 1/1984 Kato et al. .................. 242/107.4 A
4,927,172 5/1990 Motozawa .................. 280/734

FOREIGN PATENT DOCUMENTS 58-33060 10/1983 Japan .
63-35017 9/1988 Japan .

Primary Examiner—Mitchell J. Hill
Assistant Examiner—Paul Dickson
Attorney, Agent, or Firm—Brumbaugh, Graves, Donohue & Raymond

[57] ABSTRACT

In a sensor for releasing the preload of a pretensioner spring in a seat belt pretensioner, a displacement-aiding spring is provided to apply a spring force in the direction of the displacement of an inertial body by an inertia force. When acceleration is detected, the force of the displacement-aiding spring and the inertia force of the inertial body combine to release the preload of the pretensioner spring.

1 Claim, 3 Drawing Sheets

SENSOR FOR SEAT BELT PRETENSIONER

BACKGROUND OF THE INVENTION

The present invention relates to a sensor and, in particular, to a sensor for initiating the operation of a spring-type pretensioner for a vehicle seat belt.

In some seat belt systems provided in a vehicle, such as an automobile, a pretensioner is provided to pretension the belt by operating a suitable component, e.g., by rotating the belt reel of a retractor, forming a loop in the belt itself, or pulling on a buckle, in an emergency to restrain the body of an occupant tightly on the seat by eliminating slack in the belt. As the driving mechanism for creating the pretension, a piston/cylinder operated by gunpowder has been generally used in the past.

In a pretensioner using gunpowder as the driving source, an electrical trigger is needed to activate it. This involves a problem of cost. For this reason, a spring-type pretensioner has been proposed, which operates by solely mechanical means and is less expensive.

However, in the driving mechanism for operating the pretensioner, it is generally necessary to release a large amount of energy within a limited time in an emergency, such as a vehicle collision, and to rapidly and assuredly operate the pretensioner through a full stroke with a large operating force. For this reason, a powerful spring is required when a spring is used as the driving mechanism. The preload of the spring is commensurately large, and a considerable operating force is required to release that preload. Therefore, the sensor output to operate the trigger of the pretensioner must also be large.

In the past, as one of the mechanisms to operate the trigger by sensor, there has been a system, in which one end of the lever constituting the trigger directly supports an inertial body, and the preload of the spring is released during acceleration by movement of the inertial body from the supported position by an inertia force. Such a mechanism is disclosed in Japanese Provisional Utility Model Publication 33060/1983 (Japanese Utility Model Publication 35017/1988).

However, in order to obtain sufficient trigger-operating force by a conventional type sensor as described above, the inertial body used as the means for detecting acceleration must have high inertia force, and this requires a sensor of large size and high weight.

SUMMARY OF THE INVENTION

To solve the above problems, the object of the present invention is to provide a sensor for a seat belt pretensioner by which it is possible to obtain a sufficient sensor output while using an inertial body of small size and light weight.

To attain the above object, a sensor for releasing the preload of a pretensioner spring in a seat belt pretensioner, according to the present invention, is characterized in that there are provided an inertial body and a displacement-aiding spring to apply a spring force to the inertial body in the direction of its displacement by an inertia force.

In a sensor for a seat belt pretensioner according to the present invention, the preload of the pretensioner spring is released by the combined forces of the displacement-aiding spring and the inertia force of the inertial body when acceleration is detected.

For a better understanding of the invention, reference may be made to the following description of exemplary embodiments, taken in conjunction with the accompanying drawings.

DESCRIPTION OF THE EMBODIMENT

Figure 1:
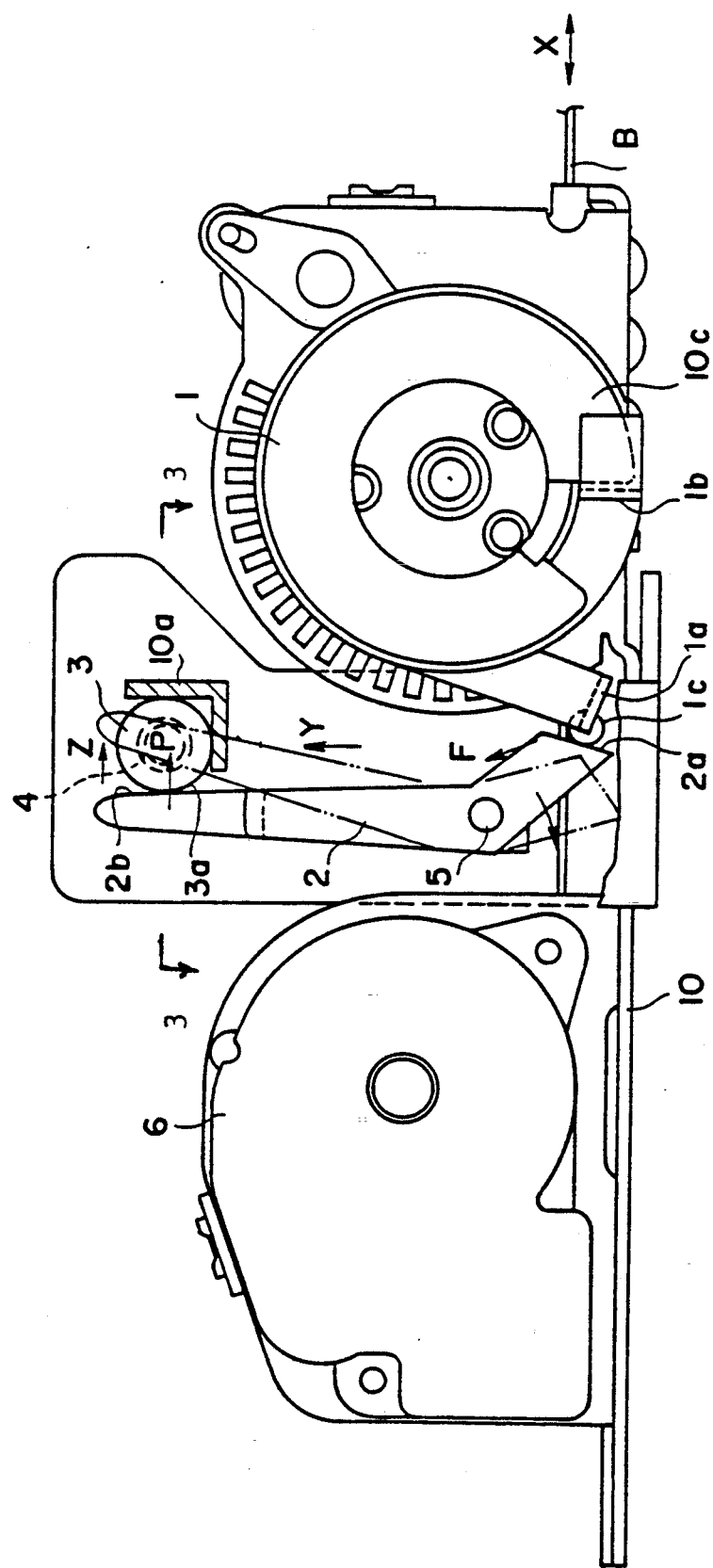
FIG. 1 is a side elevational view, a portion of which is broken away in cross-section, of an embodiment of a spring-type pretensioner according to the present invention.
Figure 2:
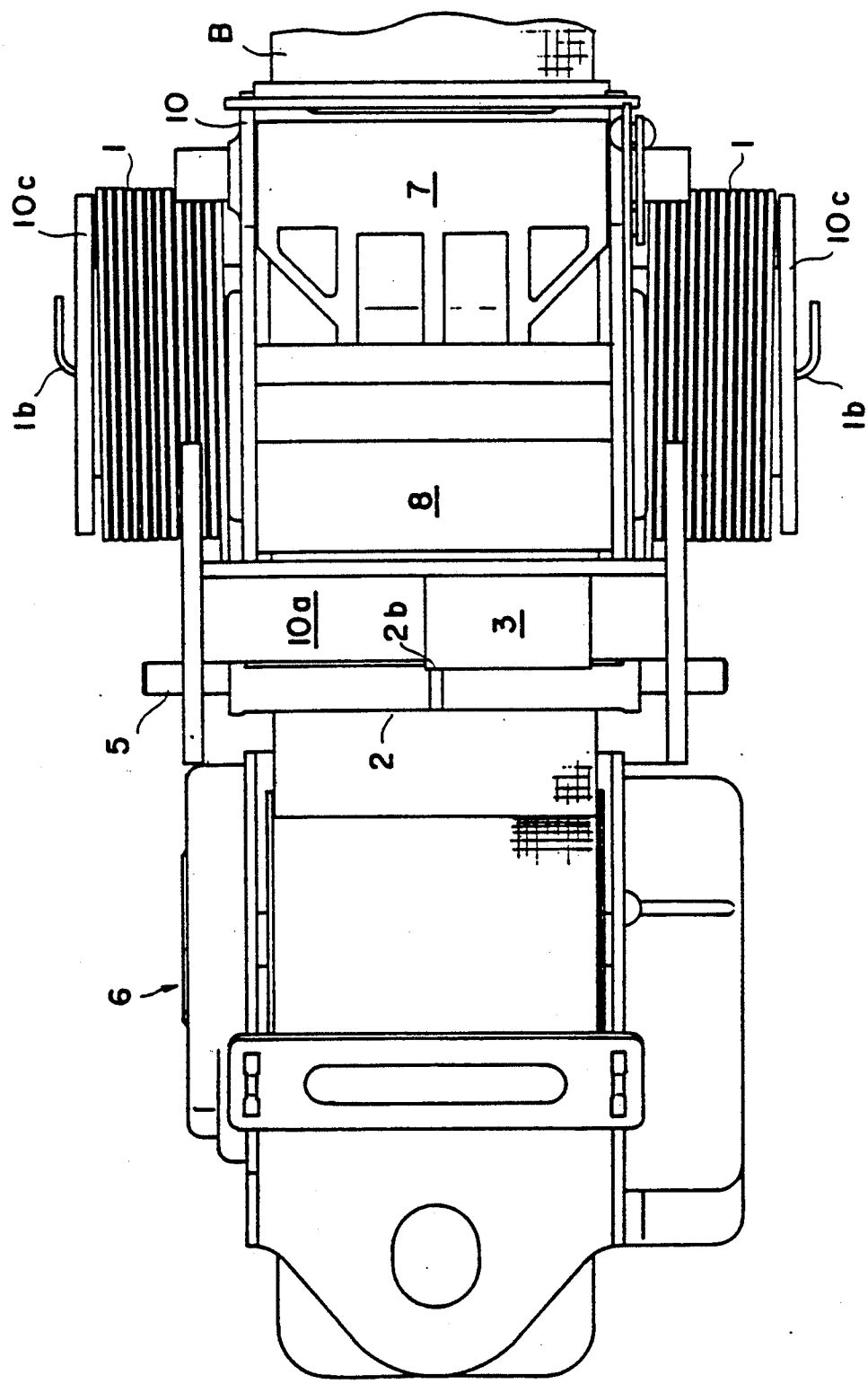
FIG. 2 is a plan view of the same.
Figure 3:
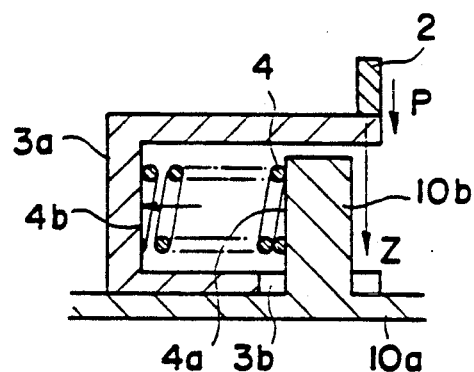
FIG. 3 is a cross-sectional view along the line 3—3 of FIG. 1.

In the embodiment of FIGS. 1 to 3, a belt B of a seat belt system is pulled in a direction Y transverse to the direction X in which it normally extends to form a loop by the operating end 1a of a torsion coil spring 1, which is a pretensioner spring. An inertial body 3 is provided in the path Z of a trigger lever 2 to hinder the displacement of the trigger lever 2. The trigger lever 2 supports the preload F of the torsion coil spring 1, and the inertial body allows the displacement of the trigger lever 2 along the path Z by an inertia force above a certain magnitude. A displacement-aiding spring 4 is provided to apply a spring load f to the inertial body in the direction of its displacement.

Describing the arrangement in more detail, the torsion coil spring 1 of the pretensioner has its base end 1b fixed on a frame 10 by a spring holder 10c, its operating end 1a in a preloaded condition and its coils arranged on opposite sides of the frame 10. A trigger lever 2 is rotatably mounted on a shaft 5 on the frame that is parallel to the coil shaft of the torsion coil spring 1. The frame 10 carries an inertial body 3 which is slidably supported on a holder 10a for movement in a direction parallel to the shaft 5. The inertia body 3 has a cavity formed in one end, which has an end wall 3a (see FIG. 3). The seat belt B leads from a retractor 6, past the operating end 1c of the pretensioner spring, and under a guide sleeve 8. The frame 10 carries a belt-clamping mechanism 7 for preventing the belt tension from being released after the belt is pretensioned.

Inclined surfaces 2a on the branched ends of the trigger lever 2 engage the operating end 1a of the torsion coil spring 1 through a belt-engaging rod 1c mounted transversely to the belt B. A lateral surface 2b near the other end of the lever 2 is positioned to contact the outer surface of the inertial body 3. Therefore, the preload F of the torsion coil spring 1 causes the trigger lever 2 to be subject to a torque T around its mounting shaft 5. The force P caused by such torsion is transmitted to the inertial body 3, and the inertial body 3 is forced against a guide wall of the holder 10a.

Referring to FIG. 3, one end 4b of a coil displacement-aiding spring 4 engages the wall 3a of the inertial body 3. The other end of the spring 4 is supported by a projection 10b, on the holder 10, which passes through a slot 3b in the inertial body 3 from the holder 10a and protrudes into the cavity within the body 3. Thus, the operating end 4b of the spring 4 is resiliently engaged with the front end wall 3a of the body 3, and the spring force f of the displacement-aiding spring 4 is always applied on the mass body 3. On the other hand, the force P is applied to the outer periphery of the body 3.

Under normal conditions, the displacement-aiding spring 4 is set in such manner that the relationship of $\mu P > f$ exists, where $\mu$ is the friction coefficient of the sliding contact surface of the holder unit 10 or trigger lever 2 and the body 3. The body stands in rest at the indicated position.

In the mechanical sensor with such arrangement, when acceleration occurs due to a vehicle collision and the acceleration value reaches a predetermined value G, the relationship becomes $\mu P < f + mG$, where m is the mass of the body 3. The body 3 is displaced and moves out of the path Z of the trigger lever 2. As a result, the lever rotates to the releasing position, which is shown by phantom lines in FIG. 1. The restraint of the operating end 1a of torsion coil spring 1 by the lever 2 is released, and the operating end 1a is rotated clockwise as the preload of the spring 1 is released. Thus, the belt B is pulled up in the direction Y by the belt-engaging rod 1c mounted on the operating end 1a. By this action, a portion of the belt B between the shaft 5 and the guide sleeve 8 is formed into an inverted V-shaped loop. Because the belt B is in such a condition that the withdrawal of the belt from the retractor 6 is prevented by locking of the retractor reel, the drawn-out portion of the belt B engaged with the vehicle occupant is pulled in, and the pretensioning action is performed to eliminate the belt slack. After the pretensioning action has been performed, the belt tends to be pulled out by an inertia force applied to it by the body of the occupant, but such pulling out of the belt B is blocked by the belt-holding action of the belt-clamping mechanism 7.

In the mechanical sensor of the above-described embodiment, a spring force is continuously applied to the inertial body 3, and that spring force is added to the inertia force to move the inertial body 3 forward during acceleration. Accordingly, a large and heavy inertial body 3 is not required to overcome the friction force $\mu P$, as in previously known inertia sensors for pretensioners. Thus, the inertial body can be designed in lightweight and compact form. Moreover, it is possible to improve the operating performance of the inertial body 3 by increasing the spring constant of the displacement-aiding spring, even when the force P is very large. This makes it possible to reduce the lever ratio of the trigger lever 2 and to design the mechanism in compact form by shortening the length of the trigger lever 2. Also, it is possible to decrease the inertia load of the moving components during the operation of the torsion coil spring 1, because the mechanism that initiates or triggers operation of the torsion coil spring 1 is composed only of the trigger lever 2. This contributes to the shortening of operating time and to assurance that the pretensioning of the belt will occur before the occupant is thrown forward in a collision.

Figure 4:
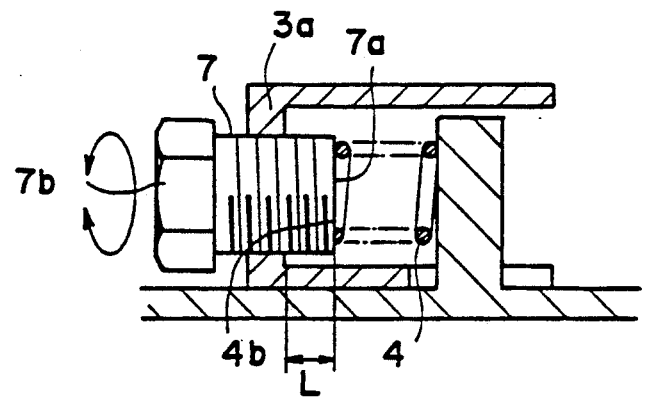
FIG. 4 is a partial cross-sectional view similar to FIG. 3, showing a modification of the embodiment of FIGS. 1 to 3.

FIG. 4 shows a modified embodiment of the present invention. A coil displacement-aiding spring 4 mounted in a cavity of the inertial body 3 resiliently engages the end of a bolt 7, which is received in a threaded hole in the front end wall 3a of the mass body 3. Therefore, the spring load f of the displacement-aiding spring 4 applied to the inertia body 3 can be set to a predetermined value within the range of the stroke L of the front end 7a of the spring by rotating the bolt head 7b. Also, bolts with different masses can be used in a mechanism that is otherwise the same, in order to vary the value G of the inertia body. The other features of this embodiment are similar to the above embodiment in both arrangement and operation, and a detailed description is not repeated here.

As described above, a spring force continuously acts on the inertial body in the sensor of the present invention, and it is possible to reduce the mass of the inertial body by adding a spring force to the inertia force, which moves the inertial body forward during acceleration corresponding to the setting value G. This contributes to the designing of the inertial body in lightweight and compact form. Moreover, the operating performance of the inertial body can be improved by increasing the spring constant of the displacement-aiding spring, even when the force is very large. Accordingly, it is possible to use a lever with a smaller lever ratio as a supporting member and to design the components in compact form by shortening the length of the support member.

The features of the invention have been described above in connection with two embodiments. It is needless to say, however, that the present invention is not limited to the above embodiments, and various changes and modifications can be adopted within the scope of the description in the accompanying claim. Also, the support member is not limited to a single lever such as a trigger lever, and the pretensioner spring is also not limited to a torsion coil spring.

I claim:

1. In a sensor for a seat belt pretensioner having a preloaded pretensioner spring and an inertial body adapted to normally hold the pretension spring in the preloaded condition and release the preload of the pretensioner spring by displacement in response to an inertia force, the improvement wherein a displacement-aiding spring is provided to apply force to the inertial body in the direction of its displacement.

* * * * *